United States Patent

[11] 3,602,630

| [72] | Inventor | Wolfgang Sassin<br>Julich, Germany |
|---|---|---|
| [21] | Appl. No. | 887,654 |
| [22] | Filed | Dec. 23, 1969 |
| [45] | Patented | Aug. 31, 1971 |
| [73] | Assignee | Kernforschungsanlage Julich GmbH.<br>Julich, Germany |
| [32] | Priority | Dec. 27, 1968 |
| [33] | | Germany |
| [31] | | P 18 17 085.9 |

[54] PIPE SYSTEM FOR LOW-TEMPERATURE FLUIDS
10 Claims, 4 Drawing Figs.

[52] U.S. Cl. .................................................. 174/15,
174/99, 138/114
[51] Int. Cl. .................................................. H01b 7/34
[50] Field of Search ............................................. 174/15, 15
C, 16 B, 99 B, 99; 138/114

[56] References Cited
UNITED STATES PATENTS

| 3,361,870 | 1/1968 | Whitehead | 174/99 (B) |
| 3,369,826 | 2/1968 | Boosey et al. | 174/SC |
| 3,390,703 | 7/1968 | Matlow | 138/114 |
| 3,397,720 | 8/1968 | Jones | 138/149 |
| 3,512,581 | 5/1970 | Lawton | 174/15 (C) |

Primary Examiner—Lewis H. Myers
Assistant Examiner—A. T. Grimley
Attorney—Karl F. Ross ABSTRACT: A conduit system for pipes containing a low-temperature fluid, e.g. for electrical conductors cooled by liquefying gases, in which the pipe is surrounded by a plurality of insulating elements interfitting in tandem along the length of the pipe and spaced from an evacuated casing surrounding the elements by respective sets of rollers. The ends of the elements have similar conicity so that interfitting of the elements provides an overlapping of the radiation shielding and thereby reduces heat transfer to the pipe traversing the elements.

INVENTOR:
Wolfgang Sassin

BY
Karl J. Ross
Attorney

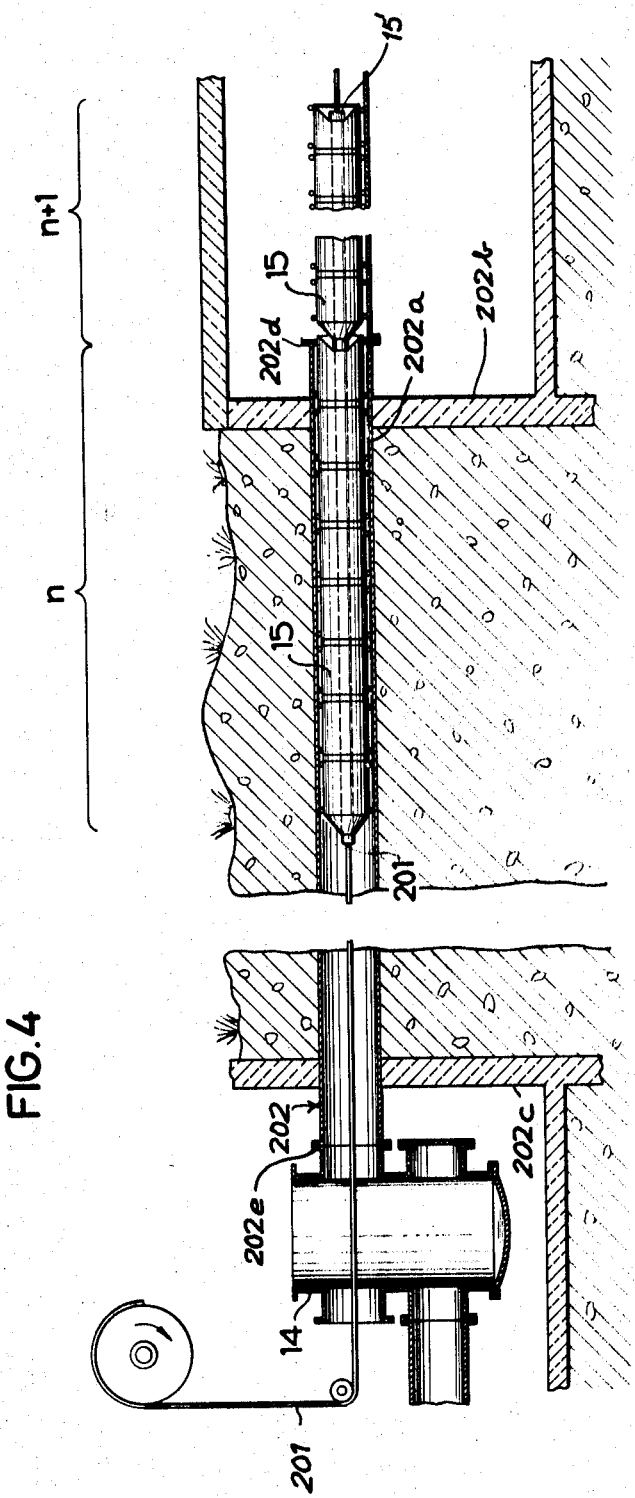

PIPE SYSTEM FOR LOW-TEMPERATURE FLUIDS

My present invention relates to a pipe system for low-temperature fluids and, more particularly, to an insulated pipe arrangement in which a central fluid-carrying conduit is surrounded by an evacuated space which may contain a radiation-restricting shield.

In cryogenic applications and other systems (e.g. electrical-conductor cooling) in which low-temperature fluids must be displaced or circulated with minimum loss of cold or gain of heat, e.g. for liquefied gases, it has been proposed to provide the conduit system of an inner fluid-carrying duct or pipe which is surrounded by an outer shell or tube spaced from the inner pipe by an annular clearance which is evacuated to limit the convective transfer of heat between the outer shell or casing and the inner fluid-carrying duct. To further increase the effective insulating quality of the system, a radiation-limiting shield may surround the inner pipe to restrict heat transfer by thermal radiation.

Systems of this type have been employed primarily for the transportation of liquefied or supercooled gases. In most instances, the radiation shield has been either rigid with the fluid-carrying duct or has constituted an attachment to the inner wall of the outer shell or casing. In neither case is relative mobility of the parts possible and difficulties are encountered when it becomes necessary to remove, for example, the radiation shield from the space between the ducts, to withdraw the inner fluid-carrying duct or otherwise to modify or to repair the assembly. Consequently it was essential to provide a maximum of protection of the parts of the system against corrosion, contamination, thermal loss and defect prior to manufacturing of the assembly, thereby increasing the original costs to reduce subsequent maintenance which was all but impossible. Finally, it was the practice to weld the prior art systems into sealed units which could not, therefore, be readily disassembled and required expensive equipment and skilled personnel.

It is, therefore, the principal object of the present invention to provide an improved pipe system for low-temperature fluids in which the aforedescribed difficulties can be obviated.

Another object of this invention is to provide a double-wall pipe system, having an inner fluid-carrying duct, an outer evacuated casing and a radiation shield interposed between the inner duct and the outer casing which allows relative movement of the parts, facilitates assembly of the system, and eliminates the high cost items common in the manufacturing of prior art ducts of similar purpose.

It is still another object of my invention to provide a system for transporting low-temperature fluids, especially liquefied and deeply cooled gases, which has high insulating character, low assembly and manufacturing cost, has considerable ease of installation and disassembly, and permits interchange of defective or damaged portions with ease.

These objects and others which will become apparent hereinafter are attained in accordance with the present invention, in a system having an evacuated casing of the general character described and receiving generally centrally a fluid-carrying duct which may be supported on a carrying tube of thermally insulating material, forming part of a thermal-radiation-limiting shield which is assembled in lengths and is movable with respect to both the outer casing and the central tube.

According to an important feature of this invention, the thermal insulation of the system is effected by detachable but releasably interconnected tubelike insulating elements at the ends of which are provided antifriction spacers engaging the walls of the casing and enabling the insulating members to be drawn through this casing. The antifriction spacers, according to this invention, include three arms extending outwardly from the insulating members and carrying rollers at each end of the insulating element, the arms being angularly equispaced about the axis of the system. The rollers, which are displaceable in engagement with the walls of the casing in the axial direction thereof, have respective axes lying parallel to tangents of the insulating elements or along chords of the interior of the casing. The generatrices of the rollers, moreover, lie perpendicular to the axis of the tube.

The ends of each of the insulating elements, which are coaxial with the fluid-carrying duct passing therethrough and the surrounding evacuated casing, are frustoconically convergent in the same direction and are complementary so as to enable the insulating elements to be fitted end-to-end to yield a substantially continuous thermal-radiation shield, in spite of the fact that the elements may be inserted into the outer casing one after another.

A significant advantage of a system according to this invention resides in that the fluid-carrying tube is retained in the radiation shield, preferably with substantially clearance from most of the surface of the support tube, and is completely encompassed by the radiation shield which imparts considerable stability to the entire pipe assembly, in spite of the fact that the radiation shield is neither rigid with the outer casing nor secured or welded to the inner fluid-carrying duct.

Furthermore, the thermal-radiation-shield material does not frictionally engage the surface of the casing and is not damaged when the radiation shield units are inserted into the casing; also, preassembly of the system is not necessary and it is possible to provide, for example, at least the body of the radiation shield at the site at which assembly is to be carried out. There is, of course, the obvious reduction in handling costs and complexity, and a considerable simplification of the assembly of the system. The radiation shield may be readily put together to fit substantially any casing at any degree of thermal barrier desired. Moreover, the conical configurations of the spacers, which according to the invention, are provided with the roller arrays at each end of the radiation shield members, ensure overlapping of the radiation shields by neighboring interfitting members so that effective insulation is maintained even at the junction sites. Another advantageous embodiment of the system according to the invention comprises an insulating element, wherein the spacer members and the support duct are each composed of at least two parts fittable around the fluid carrying pipe.

The above and other objects, features and advantages of the present invention will become more readily apparent from the following description, reference being made to the accompanying drawing in which:

FIG. 4 is a vertical section showing the system as used in an underground installation.

Figure 1:
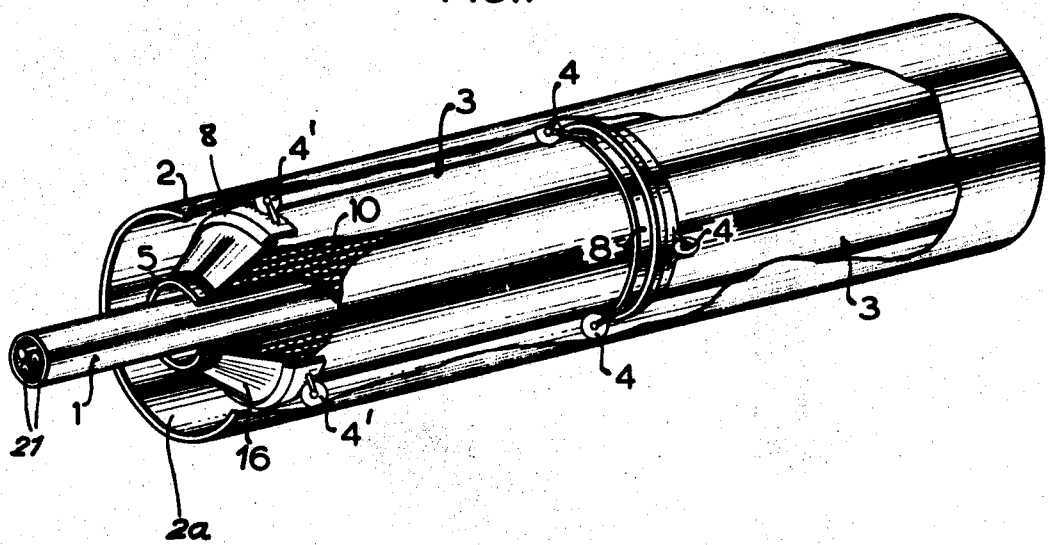
FIG. 1 is a perspective view, partly in section, of a portion of the duct system for the transport of low-temperature fluids according to the present invention.
Figure 2:
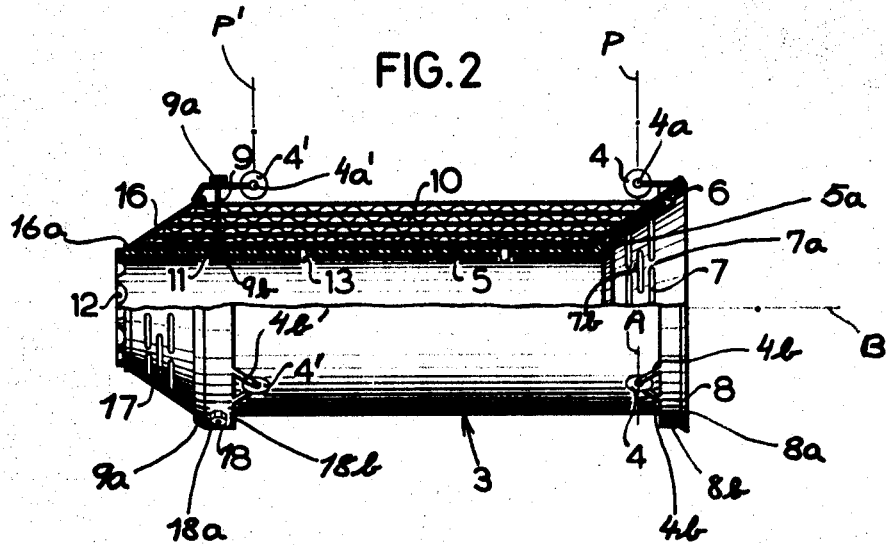
FIG. 2 is an elevational view, partly in axial section, of an insulating element of the system.

In FIGS. 1 and 2 of the drawing, there is shown a pipe 1 for the transport of low-temperature fluids, especially liquefied gases and deep-cooled gases, which passes generally centrally and substantially coaxially through an evacuated casing, mantle or shell of a much larger diameter so that an evacuated compartment 2a is formed between the inner wall of the outer casing and the outer wall of the inner pipe 1.

In the space 2a between the inner pipe 1 and the outer casing 2, the system of the present invention comprises a plurality of general tubular insulating elements 3 individually assembled about the pipe 1 and constituting shields against thermal radiation between the inner pipe and the outer casing.

At the rear end of the insulating elements 3, these elements are formed with rings 8 upon which are mounted the angularly equispaced rollers 4. The rollers 4 lie in respective axial planes of the elements 3 which are coaxial with the pipes 1 and the casing 2, and are rotatable about respective axles 4a held between converging brackets 4b as illustrated in FIG. 2.

The axes of the pivots 4a, one of which is diagrammatically shown at A in FIG. 2, extend along chords of the casing. The rollers 4 are angularly offset about the axis B of the insulating element 3 by 120° and three such rollers are provided at each end of the insulating element. It will be understood, however, that at least three such rollers are desirable upon the insulating element and that, to ensure proper positioning of the insulating element within the casing 2, the rollers should be angularly equispaced about the axis B.

Preferably the rollers are cantilevered upon the respective rings and have their peripheries lying along a circle centered upon the axis B, but of a diameter slightly greater than the internal diameter of the casing 2 so that the rollers are deflected inwardly when the insulating elements are inserted in the casing and bear outwardly there against under the inherent resilient bias of the inwardly deflected parts. Furthermore, the axis A of each set of rollers are coplanar and lie in a common plane P perpendicular to the axis B.

Basically, the insulating elements 3 each comprise, as shown in FIG. 2, a support tube 5 which is preferably composed of a thermoplastic synthetic resin or another material of low wear characteristics, low coefficient of sliding friction and low thermal conductivity. Suitable resins for this purpose are nylons, polyethylenes, polytetrafluoroethylenes, and polyvinylchloride. At the right-hand end of each of the elements 3, there is provided a frustoconical spacer 6 which may be composed of a similar synthetic resin but preferably is a thin sheet metal noncorroding body, e.g. of a stainless steel.

A frustoconical male formation 5a at a corresponding end of the support tube 5 fits snugly within the frustoconical shell 6 and thereby constitutes a seat against which the support tube 6 rests. At the base of the shell 6 and along the exterior thereof, I provide a support ring 8 of stainless steel or synthetic resin which increases the mechanical stability of the system and constitutes a mounting for the arms 4b carrying the rollers 4. The arms may be formed unitarily with the ring 8 or may be welded thereto, while the ring itself can be welded to the frustoconical shell 6. However, it may be desirable in accordance with a feature of this invention to simply force the ring 8 over the frustoconical shell 6 and permit the ring to hold its engagement of the frustoconical shield exclusively by form fitting. To this end, the outer (right-hand) rim of the ring 8 is formed as of frustoconical flange 8a of a conicity corresponding to that of the sheet metal shell 6, the balance of the ring being constituted as a cylindrical web 8b.

It will be understood that a minimum of rollers 4 should be used between the insulating elements 3 and the inner wall of the casing 2, to hold down conductive heat transfer through the rollers which may be composed of a synthetic resin material, preferably nylon, of low thermal conductivity.

Furthermore, the thinness of the sheet metal spacer 6 serves to reduce thermal conductivity through this member. Also, I prefer to perforate the sheet metal member 6 with rows of slots 7 lying in annular arrays, axially spaced from one another with the slots of the arrays being staggered from one array to the next. The slots are angularly equispaced from one another by webs 7a of sheet metal and the arrays are spaced apart by webs 7b so that the only thermal conduction path through the shell from the outer periphery to the inner periphery thereof meanders along the webs 7a, 7b and consequently is restricted. The openings 7 in the frustoconical shell 6 also have the important advantage that they communicate between the interior and exterior of the insulating elements 3 and thereby permit evacuation of the inner spaces of the latter to further decrease heat transfer by local convection currents.

At the left-hand end of the assembly there is provided another frustoconical shell 16 of stainless-steel sheet metal, the conicity of the shell 16 being similar to that of shell 6 so that members 16 and 6 are complementarily interfitting, thereby allowing the front end of one element 3 to be inserted snugly into the rear end of an adjacent element 3. An axially directed inner peripheral rim 16a of cylindrical configuration hugs the external periphery of the support tube 5. The outer peripheral rim of the sheet metal shell 16 is provided with a stabilizing ring 18 whose cylindrical portion 18b is connected with an inwardly or converging frustoconical flange 18a.

Arms 4b' cantilevered upon the ring 18 carry rollers 4' which are rotatable about respective axles 4a' whose axes lie in the common transverse plane P' and extend along chords of the casing 2 as previously described. The outward force of the rollers 4 and 4' of the two sets is practically uniformly distributed upon the casing 2 while the inner reaction pressure is substantially uniformly distributed over the bases of the sheet metal shells 6 and 16 so that deformation of these members does not occur even when the element 3 is inserted in the casing. For further stabilization of the frustoconical shells 6 and 16 they may be provided with conically arranged struts or tubes.

To reduce the frictional interengagement of the rollers 4 and 4' with the internal walls of the casing 2, the latter are provided with lubricant-free bearing layers or members which will not be affected adversely by the presence of a vacuum. An inner peripheral bearing sleeve and/or an outer peripheral sleeve of polytetrafluoroethylene (Teflon) may be employed for this purpose.

Moreover, to ensure that the spacer 16, in spite of its thin nature, will have the high compressive strength necessary to permit the assembly to be inserted in the casing and to withstand thermal stresses to which the system may be subjected, I provide a plurality of angularly equispaced tie rods 9 which extend radially through openings in the radiation shield 10, the openings being represented at 11. The tie rods 9 provide tension between the ring 8 and the inner tube 5 and are clamped between nuts 9a and 9b. Furthermore, these tie rods are composed of a material of low thermal conductivity, preferably a synthetic resin of the nylon-type.

The radiation shield 10 is, according to this invention, a plurality of turns of sheet material wound about the support tube 5, preferably in an inclined coil to conform to the inner surface of member 16 and the outer surface of member 6. The sheet material may be a so-called "superinsulation" foil, such as that marketed under the name Dimplar, and may consist of thin metallized plastic foils. Alternatively, the foil may be a cellular plastic foil having individual air-filled cells and composed of a pair of thermoplastic synthetic-resin foils sealed together and defining the cells between them.

To facilitate evacuation of the space between the fluid-carrying pipe and the support duct 5 of the insulating elements 3, the wall of the support duct 5 is provided with recesses 12 at the male end of the insulating element. The recesses are here shown to be semicircular or segmental cutouts provided in the end of the duct 5 directly in the insulating material of which the latter is composed.

As shown in FIG. 1, the frustoconical configurations of the spacer members 6 and 16, the latter of which is provided with slots 17 corresponding to the slots 7 previously described, permit the neighboring or adjacent insulating elements 3 to overlap with the insulating effect of the radiation shield 10 remaining effective even at the junction regions. The fluid-carrying pipe 1 may be loosely received within the support tube 5 which may have spacer members 13 thrust through the wall of the latter duct to carry the pipe 1 and hold the pipe away from the wall of the support duct 5. Members 3 are directly insulating material of the low-friction-type, e.g. nylon or polytetrafluoroethylene. Thus, frictional engagement of the insulating elements 3 with the pipe 2 is minimized and the entire insulating assembly can be drawn through the casing 2 and over the pipe 1 with ease.

Figure 3:
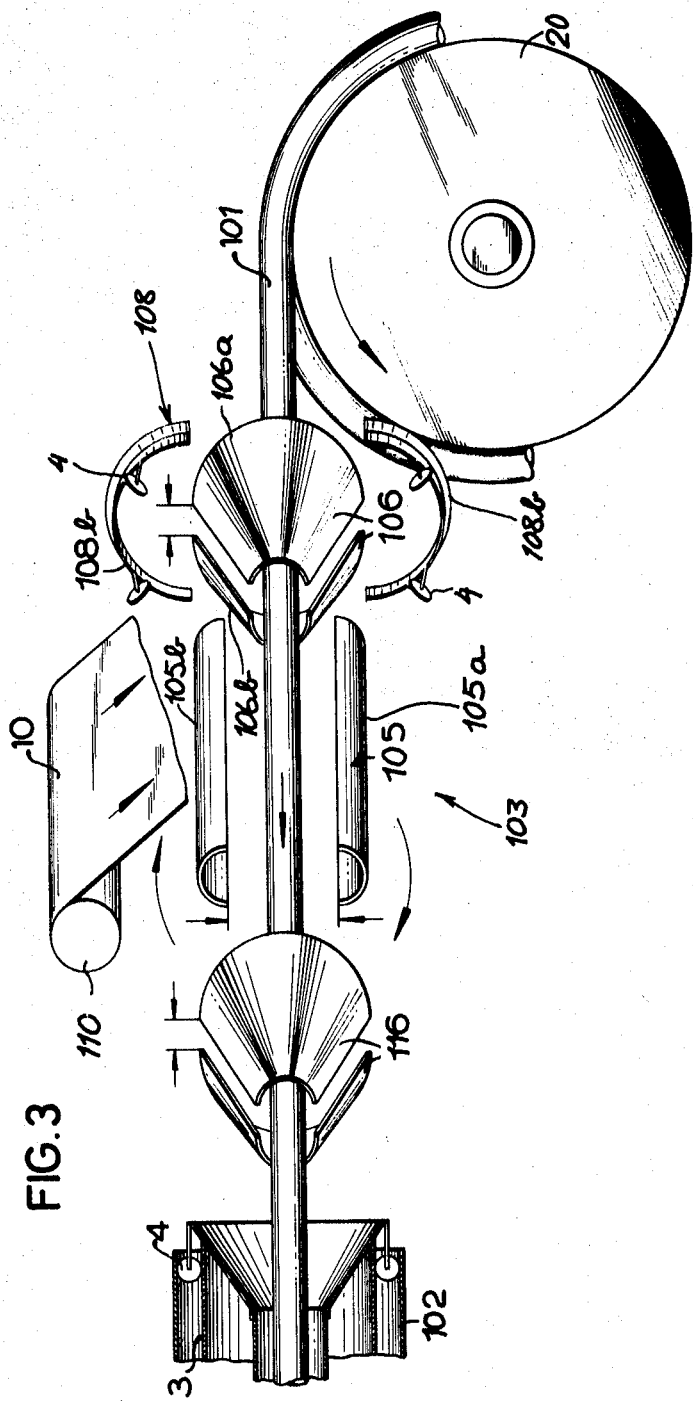
FIG. 3 is an exploded view of the system.

When the fluid-carrying pipe 1 serves as a duct for electrical conductors, e.g. in cases in which the low-temperature fluid is used to cool electrical conductors to the point at which they approach superconductivity, the pipe is preferably flexible and can be available upon reels or drums as shown at 20 of FIG. 3.

In this embodiment, the diagrammatically represented sheet metal spacer 106 is shown to be composed of two halves 106a and 106b designed to be assembled about the flexible pipe 101 as the latter is drawn in increments into the casing 102.

Similarly, the reinforcing rings 108 are composed of two halves 108a and 108b upon which the rollers 4 are distributed as previously described. Moreover, the supporting duct 105 is composed of two halves 105a and 105b, as is the converging or male shield 116. The foil 10 may be wrapped from a roll about the tube 105 when the latter is assembled around the pipe 101. The various split portions 105, 106, 108 and 116 may be assembled around the pipe 101 at the point at which the insulating assemblies 103 are to be introduced into the casing 102, with the parts being held in place by welding or adhesive bonding. The foil 10, of course, is applied in the manner previously described. The electric cables running through the pipe 1 are shown at 21.

The system illustrated in FIG. 4 makes use of the insulated pipe arrangement to prevent heating of a low-temperature fluid in a flexible pipe 201 which may be used to transport a low-temperature fluid in cooling relationship with an electric line below the ground surface.

Here the casing 202 is shown to be made up of a section 202a, spanning chambers 202b and 202c and flanged at 202d and 202e with other parts of the conduit system. The below-grade line may run for several hundred meters and may be provided with an inspection station including a standpipe 14 affording access to the casing 2. The low-temperature cable system 201 is highly sensitive to mechanical stresses, and has previously required special carriages or the like to facilitate insertion of the cable in subsurface installations such as the casing 202. With the present system, however, the insulating elements 3 form carriages 5 which enable the pipe 201 to be drawn through the casing 202 with a minimum of friction.

Here the cable 201 is shown to be supplying part or all of the traction necessary for drawing the carriages 15 into the duct 202. Moreover, the insulating bodies 315 completely encase the cable 201 and prevent any effect of the environment (e.g. weather) upon the flexible cable 201. To enable the cable to draw the carriages 3, 15 into the casing 102, the rearward ends of each section 315 may be attached at 15' to the cable. Weather effects can be avoided by carrying out the assembly in the enclosed chamber 202b which should have a length n+1 sufficient to remove one, more or all of the units 3, 15 or assemble these units for mounting upon the cable. After the cable is drawn through the casing 202 and is completely surrounded by the elements 315, the cable may be connected in the standpipe 14 which also serves as an evacuation manifold connected to a suction source. Valve or closure assemblies may be combined in conjunction with the standpipes 14 to allow selected lengths n of the casing to be vented to the atmosphere and to permit repair or maintenance work while other sections of the system remain under the vacuum.

It will be apparent that while it is preferred to assemble a multiplicity of elements upon a particular fluid carrying pipe in end-to-end relation, it is also possible to make use of a single insulating member which extends substantially the full length of the casing, especially when the parts of the insulating element are subdivided as described in connection with FIG. 4. These and other modifications, which will become readily apparent to those skilled in the art are intended to be included within the spirit and scope of the invention as defined in the appended claims.

I claim:

1. A conduit system, comprising an outer evacuable casing; a low-temperature-fluid-carrying pipe extending through said casing: and at least one insulating element surrounding said pipe and traversible thereby while being received within said casing between the latter and said pipe, said element comprising a support duct receiving said pipe with at least a limited clearance sufficient to permit relative axial movement of said element and said pipe and extending along said pipe, a body of thermal-radiation shielding surrounding said duct and carried thereby, and roller means engaging the inner wall of said casing and enabling said element to be inserted into said casing.

2. The conduit system defined in claim 1 wherein said element comprises a pair of annular spacer members at each end of said element flanking said body of thermal-radiation shielding and carrying said duct, said roller means including a respective set of angularly equispaced rollers rollingly engaging the inner wall of said casing at a plurality of locations mounted on each of said members.

3. A conduit system, comprising an outer evacuable casing; a low-temperature-fluid-carrying pipe extending through said casing; and a plurality of insulating elements surrounding said pipe in end-to-end relationship and traversed thereby while being received within said casing between the latter and said pipe, each of said elements comprising a support duct receiving said pipe with at least limited clearance and extending along said pipe, a body of thermal radiation shielding surrounding said duct and carried thereby, roller means engaging the inner wall of said casing and enabling the elements to be inserted into said casing, and a pair of annular spacer members at each end of each element flanking said body of thermal-radiation shielding and carrying said duct, said roller means including a respective set of angularly equispaced rollers mounted on each of said members, the spacer members of each of said elements being of frustoconical configuration and converging in the same direction and being complementary for interfitting of the adjacent elements.

4. The system defined in claim 3, further comprising a plurality of stabilization tierods anchored at the base of at least one of said members and traversing said body of thermal-radiation shielding and anchored to said duct, said tierods being composed of material of low thermal conductivity.

5. The system defined in claim 4, wherein said tierods are composed of nylon.

6. The system defined in claim 3, wherein said members and said duct are each composed of at least two parts fittable around said pipe.

7. The system defined in claim 3, wherein each of said members is composed of low corrosivity sheet metal and has a respective ring surrounding its base, said sets of rollers being mounted upon said rings, each of said sets of rollers consisting of at least three rollers angularly equispaced about the axis of the element and rotatable about respective axes lying along the chords of said casing in a common plane perpendicular to the axis of the casing, said duct being composed of a synthetic resin.

8. The conduit system defined in claim 7, wherein said body of thermal-radiation shielding is a coil of an insulating foil wrapped around said duct with successive turns staggered to correspond to the conicity of said members, least one of said members of each of said elements being stabilized by a plurality of angularly equispaced generally radial tierods of a low thermal conductivity synthetic resin connected to the respective ring and to said duct, while traversing said turns.

9. The conduit system defined in claim 8, wherein each of said members is provided with a multiplicity of slots in respective annular arrays with the arrays of slots being axially spaced from one another and the slots of each array being angularly equispaced about the axis of the element whereby thermal conduction along said members is restricted.

10. The conduit system defined in claim 9, wherein said pipe is a flexible conduit, further comprising at least one electrical conductor extending through said flexible conduit.